United States Patent
Corbett

[11] 3,722,192
[45] Mar. 27, 1973

[54] GRASS-CATCHING AND BAGGING APPARATUS FOR ROTARY LAWN-MOWERS

[76] Inventor: Thomas J. Corbett, 12481 Mansbrook, Sterling Heights, Mich. 48077

[22] Filed: Sept. 16, 1971

[21] Appl. No.: 181,088

[52] U.S. Cl. ................................................. 56/202
[51] Int. Cl. ............................................ A01d 35/22
[58] Field of Search ............... 56/16.6, 194, 202, 203

[56] References Cited

UNITED STATES PATENTS

| | | | |
|---|---|---|---|
| 2,910,818 | 11/1959 | Beal et al. | 56/202 X |
| 2,931,157 | 4/1960 | Smith et al. | 56/16.6 X |
| 2,942,396 | 6/1960 | Farnam | 56/194 X |
| 3,199,277 | 8/1965 | Moody | 56/16.6 |
| 2,783,604 | 3/1957 | Cahill, Jr. | 56/16.6 X |
| 2,747,356 | 5/1956 | Peterson | 56/16.6 X |

Primary Examiner—Antonio F. Guida
Assistant Examiner—J. A. Oliff
Attorney—William T. Sevald

[57] ABSTRACT

A grass-catching and bagging apparatus for rotary lawn-mowers having a duct discharging an air stream and entrained grass-cuttings. A perforate cowl is connected to the duct by a throat and has a depending flange for attaching a bag thereon. A deflector vane under the cowl leads from the throat and has an end curving downwardly centrally of the cowl and the bag thereon to direct the stream and cuttings down into the bag where the enlarged space expands and dissipates the air stream, drops the cuttings into the bag, and permits the air to rise upwardly around the downwardly centrally deflected air stream and escape through the perforate cowl. An imperforate hood over the cowl directs air escaping from the cowl endwise and sidewise. Back and side-walls on the hood deflect the escaping air downwardly while the open front deflects it forwardly. A sling supports the load in the bag attached to the cowl and sling side-walls contain the bag thereon. The sling and side-walls have perforate bottom portions and the downwardly deflected air from the hood is received within the sling and sidewalls and is vented via their perforate bottom portions adjacent the ground remote from the breathing area of a user.

7 Claims, 7 Drawing Figures

INVENTOR.
Thomas J. Corbett

INVENTOR.
Thomas J. Corbett

INVENTOR.
Thomas J. Corbett

GRASS-CATCHING AND BAGGING APPARATUS FOR ROTARY LAWN-MOWERS

This invention relates to an apparatus for catching and bagging the grass-cuttings from rotary lawn-mowers and is particularly suitable for using disposable plastic bags.

Various devices have been employed heretofore on rotary lawn-mowers to attempt to catch and bag the grass-cuttings emitting therefrom, however, the several devices of the prior art have not proven entirely satisfactory inasmuch as they are complicated in design and construction, expensive to manufacture, difficult to mount and to handle in use, become clogged or fail to catch cuttings in substantial quantity, and usually entail collecting the cuttings in a permanent type bag from which they must be removed and placed in a disposable bag or container.

With the foregoing in view, it is a primary object of the invention to collect the cuttings directly in a disposable bag which is easily mounted on and removed from the apparatus wherein the apparatus is simple in design and construction, inexpensive to manufacture, easy to mount and to handle in use, which does not become clogged, which collects substantially all the cuttings, and which eliminates the permanent type bag and the necessity to remove the cuttings from a bag and/or to replace them in a bag or container.

A further object of the invention is to provide an open-bottomed perforate cowl having a throat for receiving the air stream and entrained cuttings from a rotary lawn-mower and which constitutes a vented plenum chamber for expanding, decelerating, and dissipating the fluid air stream received from the mower together with entrained grass-cuttings and to de-train the cuttings and deposit them in the bag attached below the open bottom of the cowl.

An object of the invention is to provide a deflector vane inside the perforate cowl having a downwardly curving end centrally of the cowl for deflecting the air stream and air-borne cuttings downwardly centrally of the cowl and centrally of a bag attached below the cowl.

An object of the invention is to provide a depending flange on the cowl for attaching a collector bag thereon.

An object of the invention is to provide a support sling mountable on the mower handle for supporting the load in a collector bag.

An object of the invention is to provide side-walls on the sling for confining the collector bag with the sling and side-walls preferably having perforate bottom portions for venting downwardly deflected air adjacent the ground.

An object of the invention is to provide an imperforate hood spaced above the perforate cowl for deflecting air emitting from the cowl sidewise and endwise outwardly to keep the emitted air away from the face of a user.

An object of the invention is to provide a back-wall and side-walls on the hood for deflecting air under the hood downwardly away from the breathing area of a user and preferably between the sling - sling walls and the catcher bag attached on the cowl where it is vented close to the ground.

An object of the invention is to provide an open front end on the hood so that air deflected endwise by the hood may be ejected forwardly away from the user.

These and other objects of the invention will become apparent by reference to the following description of an exemplary grass catching and bagging apparatus embodying the invention taken in connection with the accompanying drawings, in which.

Figure 3:
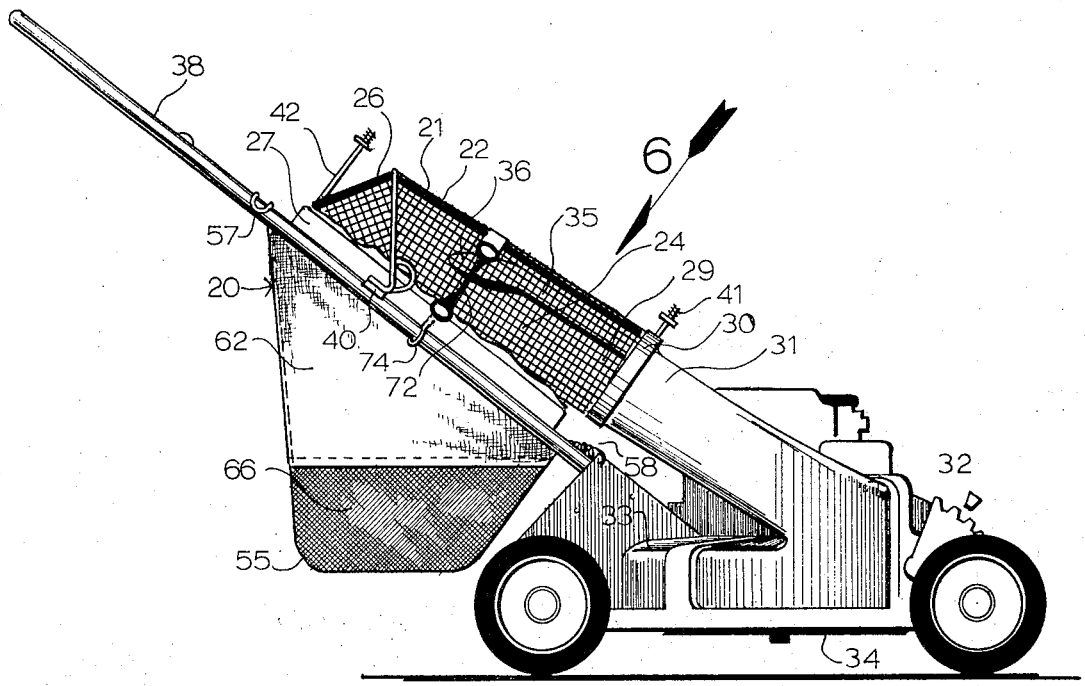
FIG. 3 is a view similar to FIG. 1 with the hood removed showing the perforate cowl and deflector vane inside the cowl.
Figure 4:
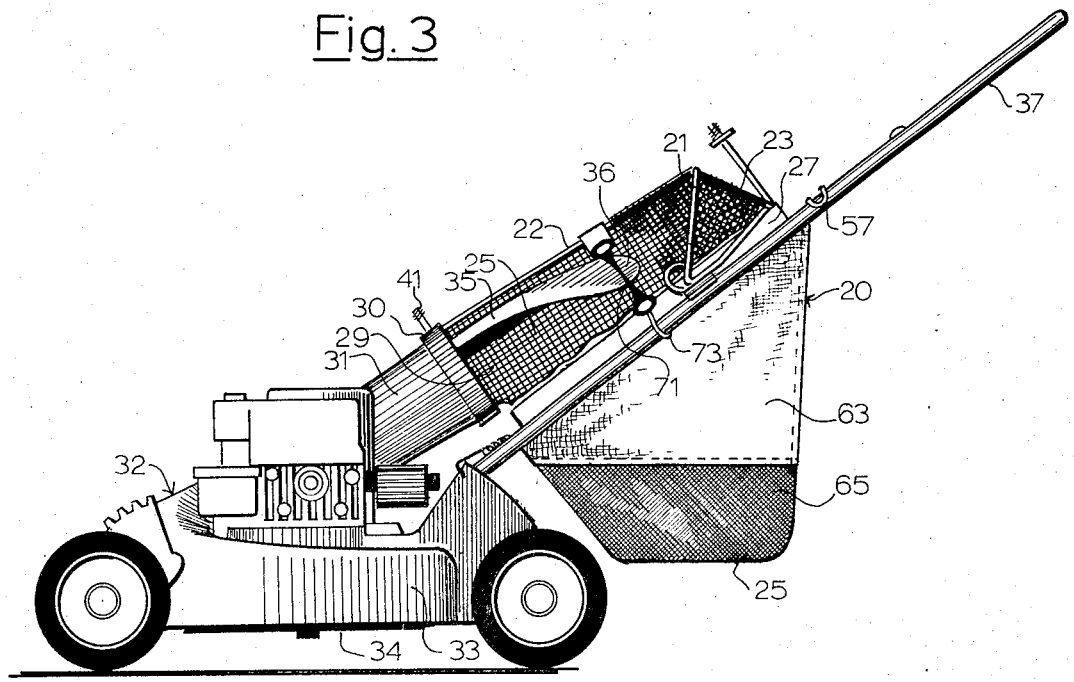
FIG. 4 is a view similar to FIG. 2 with the hood removed and the perforate cowl cut away showing the deflector vane more clearly.
Figure 5:
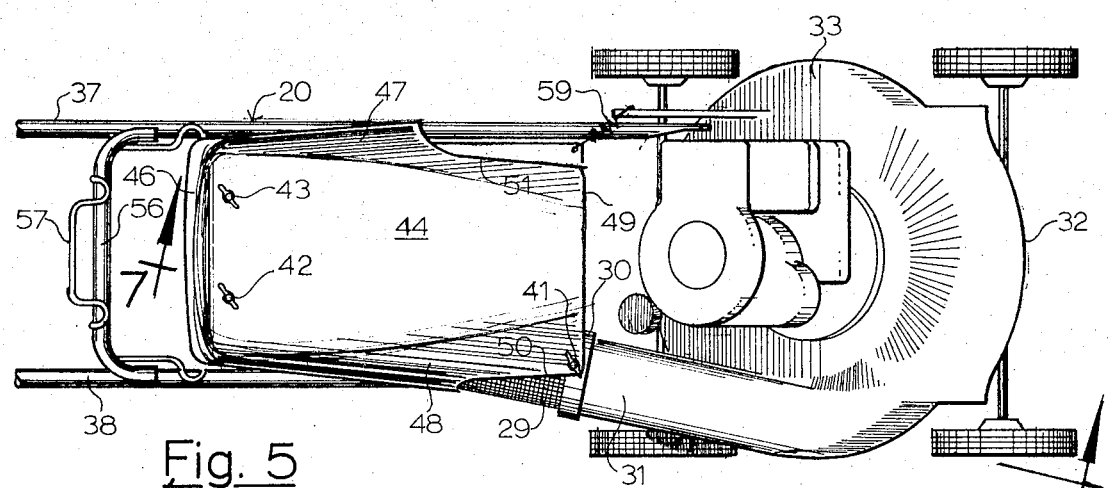
FIG. 5 is a top plan view of the apparatus and mower as seen in FIG. 1 taken in the direction of the arrow 5 of FIG. 1.
Figure 6:
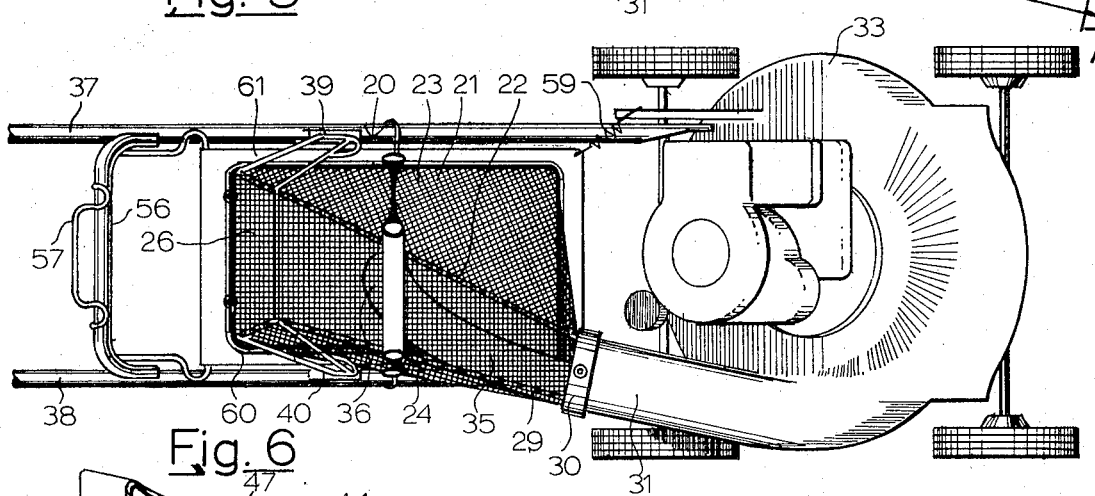
FIG. 6 is a top plan view of the apparatus and mower as seen in FIG. 3 taken in the direction of the arrow 6 of FIG. 3.
Figure 7:
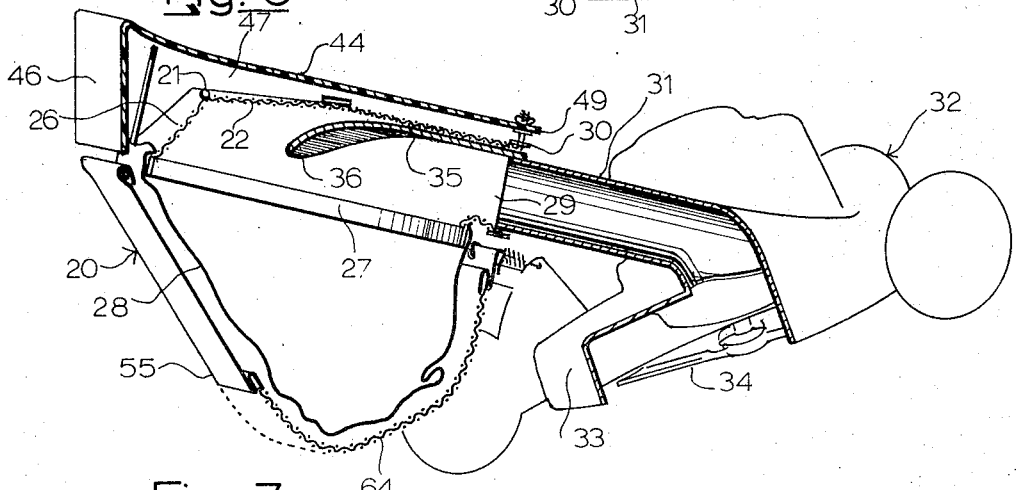
FIG. 7 is a schematic cross-sectional view illustrating the positioning and spacing of the various parts, such as taken on the line 7—7 of FIG. 5.

Referring now to the drawings wherein like numerals refer to like and corresponding parts throughout the several views, the exemplary grass catching and bagging apparatus 20 disclosed therein to illustrate the invention comprises a perforate cowl 21 which is preferably made of wire mesh and crowned from a high central portion 22 sidewise and endwise downwardly to depending side edges 23 and 24, a front edge 25, and a rear edge 26, FIGS. 3–4 and 6–7. A bottom peripheral flange 27 surrounds the edges 23–26. The top of a catcher bag 28 is attached on the flange 27. A throat opening 29 is formed in the front edge 25 of the cowl 21 and has a surrounding collar 30. The collar 30 fits on the duct 31 of the mower 32. The mower 32 has a housing 33 in which the cutter and fan blades 34 rotate. The grass-cuttings and air impelled by the blades 34 inside the housing 33 are emitted through the duct 31 in a fluid stream of air and entrained cuttings through the throat 29 into and under the cowl 21 above the bag 28. A deflector vane 35 is located in the throat 29 and has a downwardly curving end 36 centrally of the cowl 21 and the bag 28. The deflector vane 35 and its downwardly curving end 36 guide the fluid stream away from the top 22 of the cowl 21 and direct it downwardly into the bag 28. The fluid stream decelerates, expands, and dissipates in the cowl 21 and bag 28 and vents upwardly through the perforate cowl 21 while at the same time letting cuttings fall into the bag 28.

The double handle bars 37 and 38 rise rearwardly of the mower 32 and provide supports for the cowl 21. Brackets 39 and 40 attached to the cowl 21 rest on the bars 37 and 38 respectively. Elastic hold-down straps 71 and 72 are provided with hooks 73 and 74 which engage the handle bars 37 and 38 respectively and hold the brackets 39 and 40 on the bars 37 and 38. This mounts the cowl 21 on the mower 32.

A post 41 rises from the throat collar 30 and posts 42 and 43 rise from the rear edge 26 of the cowl 21. A hood 44 has openings receiving the posts 41–43 and is superposed above the cowl 21 in spaced relationship thereto creating air channels therebetween. Nuts 45 screwed in the posts 41–43 secure the hood 44 in mounted condition.

The hood 44 has a depending back-wall 46, depending side-walls 47 and 48, and an open front 49. The sidewalls 47 and 48 may be relieved by cut-out reliefs 50 and 51 adjacent the hood front 49. The walls 46–48 of the hood 44 lie spaced outwardly of the cowl 21. The hood 44 blocks the air rising upwardly from the cowl 21 and deflects it outwardly sidewise and endwise against the back-wall 46, side-walls 47 and 48, and through the open front 49. The back-wall 46 and side-walls 47 and 48 on the hood 44 deflect the air downwardly past the cowl peripheral flange 27 and around the bag 28. The open front 49 and side-wall reliefs 50 and 51 of the hood 44 direct the air from the hood 44 downwardly-forwardly toward the mower 32.

A sling 55 lies under the bag 28 and supports the bag 28 and the load of grass-cuttings therein. The handle bars 37 and 38 have a cross-rod 56 remote from the mower 32. A formed wire handle 57 attached on the rear end of the sling 55 engages the cross-rod 56 and the handle bars 37 and 38. Springs 58 and 59 on the front end of the sling 55 mount the sling 55 at its front end on the handle bars 37 and 38. Linear members 60 and 61, FIG. 6, transfer the tension of the springs 58 and 59 to the handle 57 urging it into engagement with the cross-rod 56 and allow the sling 55 to curve below the bag 28 between the springs 58 and 59 at the front end and the handle 57 at the back end. The sling is thus demountable by removing the handle 57 from the cross-rod 56 and this provides access and space for attaching ad removing the bag 28 relative to the cowl 21.

Figure 1:
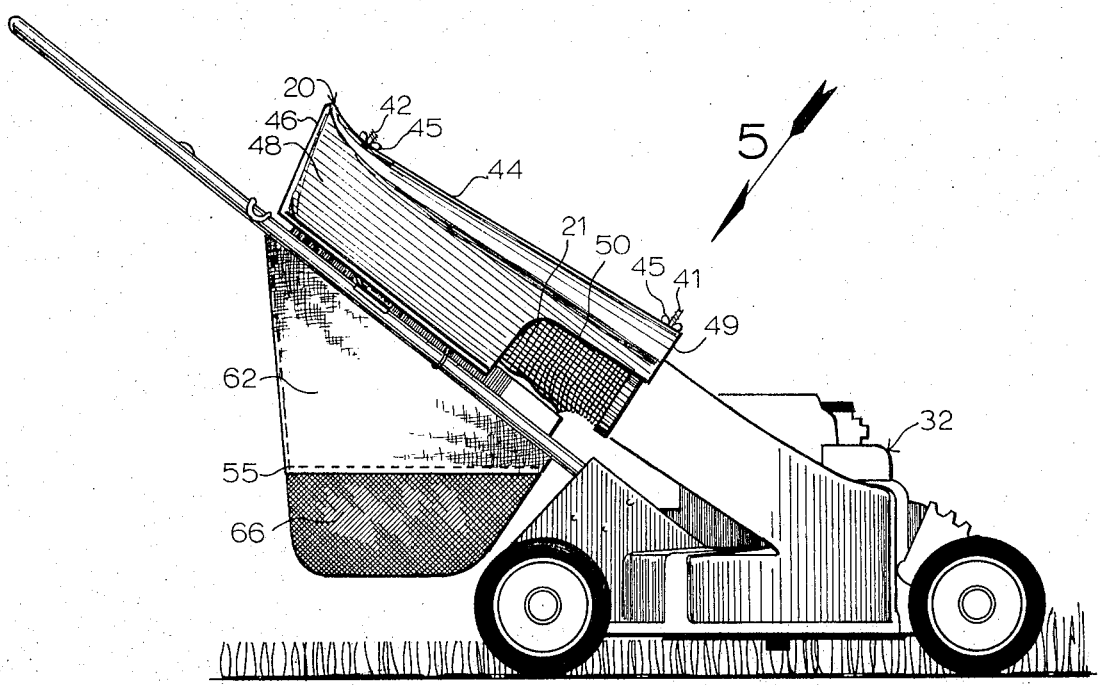
FIG. 1 is an elevational view of the right side of the grass catching and bagging apparatus mounted on a rotary mower.
Figure 2:
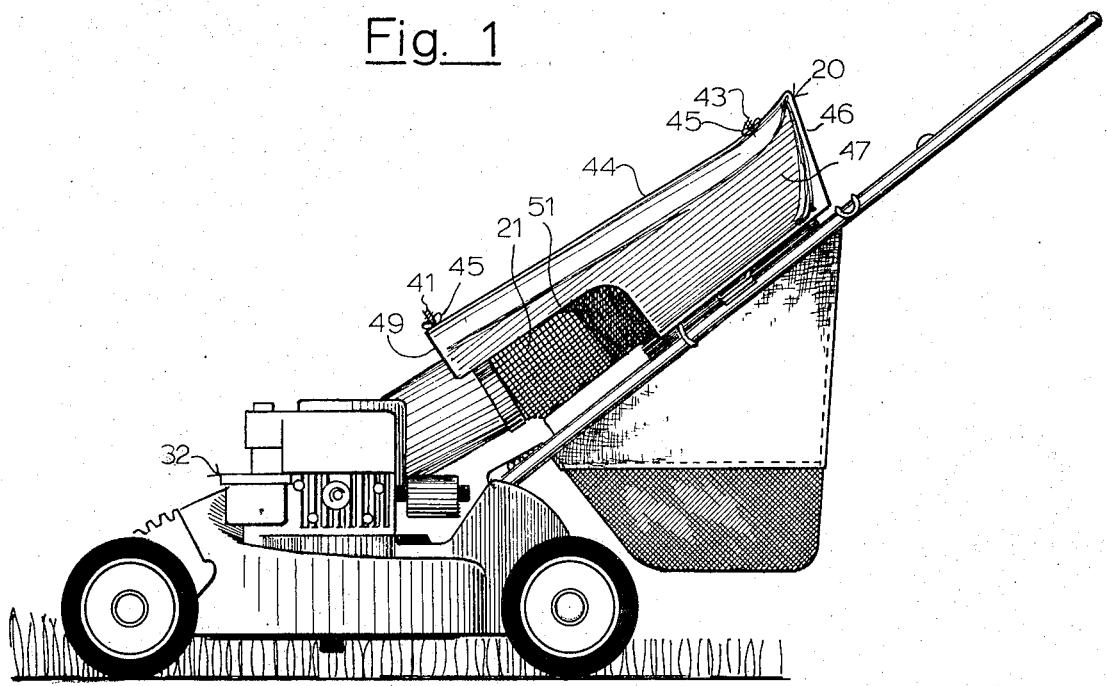
FIG. 2 is a left side elevational view of the apparatus and mower seen in FIG. 1.

Side-walls 62 and 63 are formed on the sling 55 between the linear members 60 and 61 and the sling 55. The sling 55 has a perforate bottom-forward portion 64, FIG. 7, and the sling side-walls 62 and 63 have perforate bottom portions 65 and 66, FIGS. 1–4, for emitting air inside the sling which is being deflected downwardly by the hood back-wall 46 and side-walls 47 and 48.

Preparatory to operation, the user releases the handle 57 and drops the sling 55 and side-walls 62 and 63. This clears the space below the cowl 21. The user then attaches a bag 28 on the flange 27 of the cowl 21. With plastic trash bags, the flange 27 may be of selected peripheral size to stretch the bag 28 thereon in mounted condition. Also the flange 27 may be grooved and an elastic band stretched over the bag 28 to attach it to the flange 27 below the cowl 21. Any desirable means of mounting the bag 28 below the cowl 21 may be used, but the stretch method provides a quick and easy means for attaching a disposable plastic bag 28 on the flange 27 of the cowl 21. After the bag 28 is attached, the user remounts the handle 57 on the cross-rod 56 and this locates the sling 55 under the bag 28 in supporting condition. The user then starts the mower 32 with the grass catcher and bagger 20 ready for use.

In operation, the cutter and fan blades 34 of the mower 32 cut through the grass and produce the cuttings while at the same time developing an air flow entraining the cuttings in the housing 33 which is blown out the duct 31 in a fluid stream through the throat 29 and inside the cowl 21. As the fluid stream of air and cuttings enters the cowl 21 it is engaged by the deflector vane 35, prevented from engaging the cowl 21, and deflected downwardly in the central portion of the cowl 21 and the bag 28. When the fluid stream leaves the confinement of the duct 31, as blown by the blades 34, it is no longer under forced conditions and decelerates, expands, and dissipates pressure and losses density whereby the entrained cuttings become non-air-borne and drop into the bag 28 as the perforate cowl 21 allows adequate communication to atmospheric pressure. The fluid stream, after carrying the cuttings to the bottom of the bag 28, is then spent and inadequate to raise them to the cowl 21 against gravity. The spent air from the dissipated fluid stream then raises upwardly in the bag 28 around the fluid stream being deflected downwardly into the bag 28 and is vented through the perforate cowl 21.

Under dry and dusty conditions and/or with the housing 33 adjusted close to the ground, the fan blades 34 pick up a substantial quantity of soil, dust, sand, and small stones and this too is entrained in the fluid stream and deposited in the bag 28. However, all the light dry soil and dust particles do not deposit in the bag 28 and a substantial quantity of these particles are emitted upwardly through the perforate cowl 21 directly in front of the user and this is an objectionable condition which is corrected by the hood 44.

The hood 44 blocks the upward flow of air from the perforate cowl 21 and deflects it sidewise and endwise outwardly of the cowl 21. The back-wall 46 of the hood 44 deflects the rearwardly traveling air downwardly between the sling 55 and the bag 28, and the hood side-walls 47 and 48 deflect the sidewardly traveling air downwardly between the bag 28 and the sling side-walls 62 and 63 from where it is vented by the sling perforate bottom portions 64, 65, and 66. This further deflecting and traveling of the air slows it down while at the same time dropping the dust and soil particles between the bag 28 and the sling 55 and its side-walls 62 and 63 from where these particles are dropped on the ground through the mesh portions 64-66. Thus dusty and dirty vented air adjacent the user is controlled to substantially eliminate projection of same to the face area of the user.

The vented air and dust and soil particles traveling endwise forwardly under the hood 44 are projected forwardly by the open front 49 of the hood 44. The vented air and dust and soil particles traveling sidewise outwardly under the hood 44 at the side cut-out reliefs 50 and 51 are projected sidewise downwardly and directed to the ground on either side of the mower 32 where the dust and soil particles separate from the air substantially completely. Thus the vented air, dust, and dirt at the front 49 and at the side reliefs 50 and 51 of the hood 44 are directed away from the user, sidewise of his path of travel, and away from his face position.

The perforate cowl 21 and hood 44 vent the air rising from the bag 28 with negligibly small back-pressure on the duct 31 and the interior of the housing 33 so that the efficiency of the housing 33, blades 34, and duct 31 remains substantially fully operative to develop a fluid stream to entrain the cuttings and deliver them inside the perforate cowl 21. This has been determined in actual use and the foregoing is the actual result devoid of theory as it is well understood that the action fluid streams and plenums must be determined essentially by trial to determine their actual working.

While the mower handle bars 37 and 38 have been described as the supports for the perforate cowl 21 and sling 55, it will be understood that other supports and brackets may be made and used at the back and/or sides of the mower, such as when the discharge duct emits sidewardly of the mower. The hood 44 may be mounted on means other than the cowl 21 such as on brackets and the sling 55 also may be mounted as desired or needed to suit a mower structure. Other modifications may be made within the purview of the invention and the scope of the invention is defined in the claims appended hereto.

I claim:

1. A grass-cutting catcher and bagger apparatus for rotary lawn-mowers having revolving cutter and fan blades in a housing equipped with a delivery duct leading from the housing for emitting a fluid stream of air and entrained air-borne grass-cuttings, comprising, a cowl having a perforate top equipped with a throat opening for connecting on the delivery duct of the mower so that air and cuttings emitting from the duct are delivered within the cowl, a peripheral flange depending from said cowl for attaching a collecting bag thereon, a deflector vane in said cowl leading from the top of said throat to a point about centrally in said cowl and terminating thereat in a downwardly curving end for guiding the fluid stream of air and cuttings downwardly into a bag attached below said cowl, and means for supporting said cowl on a mower;

said cowl with a bag attached on said flange allowing expansion, dissipation, and deceleration of the fluid stream from the mower to a slower moving air mass thereby disentraining the cuttings to fall into the bag and evacuating the air mass upwardly through said perforate cowl around the fluid stream being deflected by said deflector vane.

2. In an apparatus as set forth in claim 1, an imperforate hood lying above and spaced from said perforate cowl constituting a baffle to deflect air venting from said perforate cowl from an upward direction in front of a user to a transverse direction relative to a user to prevent vented air from rising in front of a user in his path as he travels behind the mower.

3. In an apparatus as set forth in claim 1, paired bars comprising a portion of said means for supporting said cowl, and a sling suspended on said bars between a point adjacent the mower and a point remote from the mower so as to underlie said cowl and a bag attached thereto for supporting the weight of the cuttings in the bag.

4. In an apparatus as set forth in claim 3, side-walls on said sling to contain a bag below said cowl against sidewise slipping movement on said sling.

5. In an apparatus as set forth in claim 4, said sling having a perforate bottom portion and said sling side-walls having a perforate bottom portion;

an imperforate hood overlying said perforate cowl in spaced relationship thereto to deflect air emitting upwardly from said cowl to sidewise and endwise travel relative of said cowl, a back-wall on said hood for preventing rearwardly deflected air away from a user and to direct same downwardly into said sling between said side-walls and the outside of a bag attached on said cowl, side-walls on said hood for preventing sidewise deflected air from a user and to direct same downwardly into said sling and said sling side-walls and outside a bag attached on said cowl;

said front on said hood being open to direct front-endwise deflected air away from a user;

said downwardly deflected air inside said sling and said sling side-walls escaping at said perforate bottom portions thereof adjacent the ground and the feet of a user remote from his breathing area.

6. In an apparatus as set forth in claim 1, an imperforate hood over said perforate cowl lying in spaced relationship to said perforate cowl, said hood having side-walls, a back-wall remote from said cowl throat, and an open front adjacent said cowl throat, said hood constituting a baffle for directing air escaping from said perforate cowl forwardly at said open front and downwardly at said back and side-walls away from a user.

7. In an apparatus as set forth in claim 6, said side-walls being cut-away adjacent said open front of said hood to direct air escaping from said perforate cowl under said hood in a downwardly-forwardly direction adjacent said open front.

* * * * *